(12) United States Patent
Hirano et al.

(10) Patent No.: US 6,258,003 B1
(45) Date of Patent: Jul. 10, 2001

(54) INFINITE SPEED RATIO TRANSMISSION DEVICE AND ASSEMBLY METHOD THEREOF

(75) Inventors: Hiroyuki Hirano, Kanagawa; Masaki Nakano, Yokohama, both of (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 09/502,017

(22) Filed: Feb. 11, 2000

(30) Foreign Application Priority Data

Feb. 15, 1999 (JP) .................................................. 11-35877

(51) Int. Cl.[7] .................................................. F16H 15/00
(52) U.S. Cl. ............................................................ 475/216
(58) Field of Search .......................... 475/216; 74/606 R

(56) References Cited

U.S. PATENT DOCUMENTS 5,902,208 * 5/1999 Nakano ................................... 475/42
5,935,039   8/1999 Sakai et al. ............................. 476/10
6,155,951 * 12/2000 Kuhn et al. ............................ 475/216
6,171,210 * 1/2001 Miyata et al. ......................... 475/216

FOREIGN PATENT DOCUMENTS 63-219956   9/1988 (JP) .
9-317837   12/1997 (JP) .

* cited by examiner

Primary Examiner—Dirk Wright
(74) Attorney, Agent, or Firm—Foley & Lardner

(57) ABSTRACT

An upper link (100) connecting four trunnions (30) of a first toroidal unit (2A) and second toroidal unit (2B) is formed of a first part (102) corresponding to the first toroidal unit (2A) and a second part (101) corresponding to the second toroidal unit (2B). The first part (102) is supported in a casing (14) via a first upper link supporting member (27X), while the second part (101) is fixed to the casing (14) via a second upper link supporting member (27Y). The first part (102) is also fixed to the second part (101) by bolts 105). The rotation outputs of the first toroidal unit (2A) and second toroidal unit (2B) are transmitted to a planetary gear unit (5) via a chain (40) from an output sprocket (24) provided between the two toroidal units (2A, 2B).

10 Claims, 9 Drawing Sheets

INFINITE SPEED RATIO TRANSMISSION DEVICE AND ASSEMBLY METHOD THEREOF

FIELD OF THE INVENTION

This invention relates to an infinite speed ratio, transmission device for vehicles comprising a toroidal continuously variable transmission, a fixed speed ratio transmission and a planetary gear set.

BACKGROUND OF THE INVENTION

In order to increase the range of speed ratio in a toroidal continuously variable transmission for vehicles, U.S. Pat. No. 5,935,039 and Tokkai Sho 63-219956 published by the Japanese Patent Office in 1988 disclose an infinite speed ratio transmission device using a toroidal continuously variable transmission (CVT) with double cavity, fixed speed ratio transmission and planetary gear set. In such an infinite speed ratio transmission device, an engine output is input to the CVT and fixed speed ratio transmission. The output shaft of the CVT is joined to a sun gear of the planetary gear set, and the output shaft of the fixed speed ratio transmission is joined to a planet carrier of the planetary gear set via a power circulation mode clutch. A ring gear of the planetary gear set is joined to a final output shaft of the transmission device which drives the wheels. The output shaft of the CVT is also joined to the final output shaft via a direct mode clutch.

In this device, two types of power transmission are used, i.e. a direct drive mode wherein the direct mode clutch is engaged and the power circulation mode clutch is disengaged, and a power circulation mode wherein the direct mode clutch is disengaged and the power circulation mode clutch is engaged. In the direct drive mode, the engine output is transmitted to the drive shaft via the CVT. In the power circulation mode, the rotation of the ring gear stops at a position where the rotation of the sun gear due to the output of the fixed speed ratio transmission and the rotation of the planet carrier due to the output of the CVT are balanced. This state corresponds to a neutral state where rotation torque is not transmitted to the drive shaft. In this case, the ratio of the engine speed and the rotation speed of the final output shaft becomes infinite.

With respect to the construction of the CVT, Tokkai Hei 9-317837 published by the Japanese Patent Office in 1997 discloses an upper link and lower link for displacing trunnions facing each other with opposite phase in the axial direction. The upper link is supported by a post fixed to a casing via a pin.

SUMMARY OF THE INVENTION

Some infinite speed ratio transmission devices transmit the output of the CVT to the sun gear via a pair of sprockets and a chain. However, in these devices, the upper link attached to the casing interferes with the chain when assembling the transmission device. In the double cavity CVT, one sprocket is situated between a pair of output disks, and if the upper links situated on both sides in the axial direction of the sprocket are previously attached to the casing, the chain cannot be looped around the sprocket.

It is therefore an object of this invention to facilitate the fitting of a chain to the CVT of an infinite speed ratio transmission device.

In order to achieve the above object, this invention provides an infinite speed ratio transmission device for a vehicle, comprising an input shaft, a first toroidal unit comprising a first input disk which rotates together with the input shaft, a first output disk, and two power rollers gripped between the first input disk and the first output disk, a second toroidal unit comprising a second input disk which rotates together with the input shaft, a second output disk, and two power rollers gripped between the second input disk and the second output disk, the first output disk and the second output disk being disposed coaxially and adjacent to each other, an output sprocket which is disposed between and rotates together with the first output disk and the second output disk, four trunnions which support the four power rollers of the first toroidal unit and the second toroidal unit, an upper link holding the upper end of the four trunnions, the upper link comprising a first part holding the two trunnions of the first toroidal unit, and a second part holding the two trunnions of the second toroidal unit, the first part and the second part being formed separately and fixed to each other, a fixed speed ratio transmission which transmits a rotation of the input shaft at a fixed speed ratio to an output gear, a planetary gear set comprising a sun gear joined to a sprocket, a planet carrier which rotates together with the output gear, and a ring gear which rotates according to a relative rotation of the sun gear and the planet carrier, a chain connecting the output sprocket and the sprocket, a casing housing the first toroidal unit, the second toroidal unit and the planetary gear set, a first upper link supporting member fixed to the casing which supports the first part in the casing, a second upper link supporting member fixed to the casing which supports the second part in the casing, and an intermediate wall fixed to the casing which supports the output sprocket free to rotate.

This invention also provides an assembly method of the above infinite speed ratio transmission device. The method comprises fixing the second upper link supporting member to the casing, fitting the second part to the second upper link supporting member, setting the output sprocket at a predetermined position in the casing, inserting the sprocket around which the chain has been looped and the planetary gear unit in the casing, looping the chain around the output sprocket, setting the sprocket and the planetary gear unit at a predetermined position in the casing, fixing the first upper link supporting member to the casing, fitting the first part to the first upper link supporting member, and joining the first part to the second part.

This invention also provides an assembly method comprising fixing the second upper link supporting member to the casing, fitting the second part to the second upper link supporting member, looping the chain around the output sprocket and the sprocket, fitting the intermediate wall on the output sprocket, setting the output sprocket on which the intermediate wall is fitted and the planetary gear set in which the sprocket is combined with the output sprocket via the chain, at a predetermined position in the casing, fixing the first upper link supporting member to the casing fitting the first part to the first upper link supporting member, and joining the first part to the second part.

This Invention also provides an assembly method of the infinite speed ratio transmission device in which the intermediate wall further comprise a front partition disposed between the first output disk and the output sprocket, a rear partition disposed between the second output disk and the output sprocket, and a fixing member which fixes the front partition to the rear partition. The method comprises fixing the second upper link supporting member to the casing, fitting the second part to the second upper link supporting member, setting the output sprocket at a predetermined position in the casing together with the rear partition, inserting the sprocket around which the chain has been looped and the planetary gear unit in the casing, looping the chain around the output sprocket, setting the sprocket and the planetary gear unit at a predetermined position in the casing, fixing the front partition to the rear partition by the fixing member, fixing the first upper link supporting member to the casing, fitting the first part to the first upper link supporting member, and joining the first part to the second part.

The details as well as other features and advantages of this invention are set forth in the remainder of the specification and are shown in the accompanying drawings.

DESCRIPTION OF THE PREFERRED EMBODIMENTS

Figure 1:
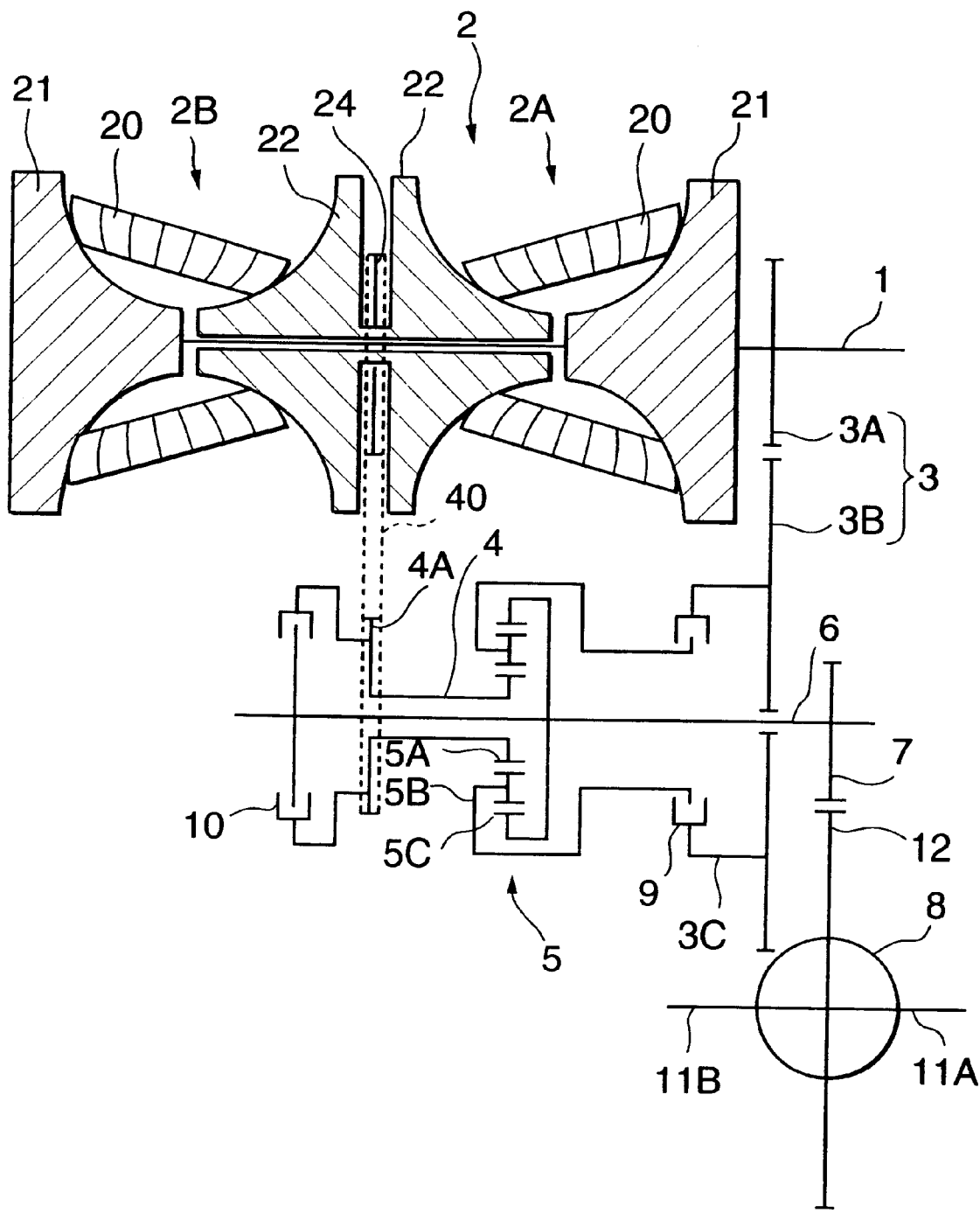
FIG. 1 is a schematic diagram of an infinite speed ratio transmission device according to this invention.

Referring to FIG. 1 of the drawings, an infinite speed ratio transmission device for a vehicle comprises an input shaft 1, a toroldal continuously variable transmission (CVT) 2, a fixed speed ratio transmission 3, planetary gear set 5 and final output shaft 6. The CVT 2 comprises a half toroidal type first toroidal unit 2A and second toroidal unit 2B. Each of the toroidal units 2A, 2B comprise an input disk 21 and output disk 22, respectively.

A pair of power rollers 20 are gripped between the input disk 21 and output disk 22.

The input disks 21 rotate together with the input shaft 1. The input shaft 1 is joined to an engine output shaft, not shown. The output disk 22 of the first toroidal unit 2A is joined to the output disk 22 of the second toroidal unit 2B, and the output disks rotate together with an output sprocket 24 disposed between the output disks 22. The rotation of the output sprocket 24 is transmitted to a CVT output shaft 4 via a chain 40 and sprocket 4A.

The CVT output shaft 4 is joined to a sun gear 5A of the planetary gear set 5, and is also joined to a final output shaft 6 via a direct clutch 10.

The fixed speed ratio transmission 3 comprises an input gear 3A which rotates together with the input shaft 1, output gear 3B and gear output shaft 3C. The input gear 3A is meshed with the output gear 3B, and the output gear 3B is joined to the gear output shaft 3C. The gear output shaft 3C is joined to a planet carrier SB holding a plurality of planet gears of the planetary gear set 5 via a power circulation mode clutch 9. A ring gear 5C of the planetary gear unit 5 is joined to the final output shaft 6.

The rotation of the final output shaft 6 is transmitted to drive wheel shafts 11A, 11B of the vehicle via a transmission output gear 7, final gear 12 and differential 8.

With this infinite speed ratio transmission device, the drive wheel shafts 11A, 11B are driven by either of two transmission modes, i.e., a power circulation mode wherein the power circulation mode clutch 9 is engaged and the direct mode clutch 10 is disengaged, and a direct mode wherein the power circulation mode clutch 9 is disengaged and the direct mode clutch 10 is engaged. In the power circulation mode, the rotation speed of the final output shaft 6 can be continuously varied from a negative value to a positive value according to the difference of the speed ratios of the CVT 2 and the fixed speed ratio transmission 3.

Figure 2:
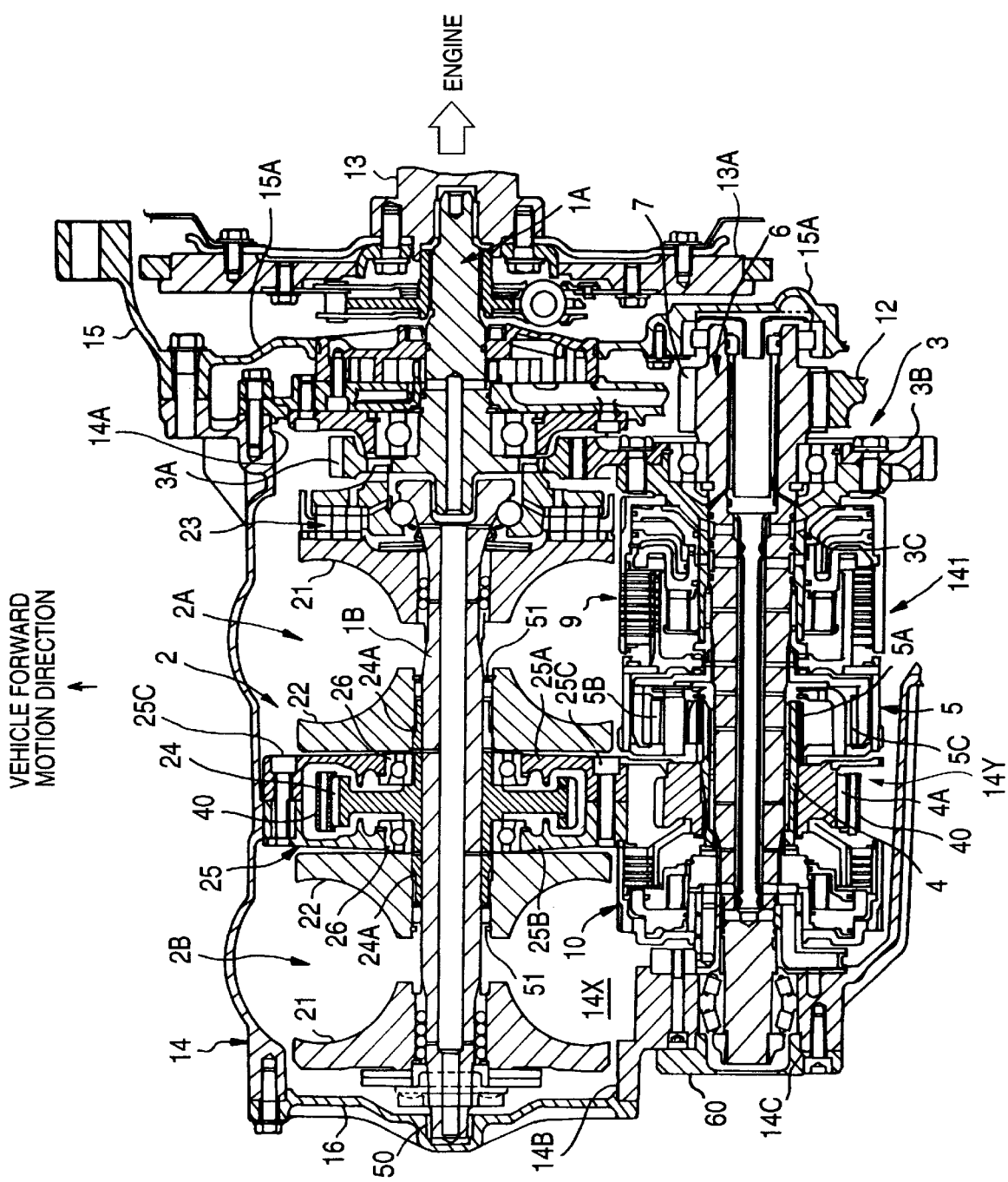
FIG. 2 is a vertical sectional view of the infinite speed ratio transmission device.

Referring to FIG. 2, the input shaft 1 comprises the shafts 1A, 1B which are disposed coaxially and rotate together via loading cams 23. The shaft 1A is joined to a crankshaft 13 of an engine of the vehicle. A flywheel 13A is attached to the crankshaft 13. An input gear 3A of the fixed speed ratio transmission 3 is fixed to the shaft 1A.

This infinite speed ratio transmission device is disposed in an engine room of the vehicle such that the input shaft 1 makes a right angle with the vehicle forward motion direction. The upward direction in the figure corresponds to the direction of the vehicle forward motion. The shaft 1B is joined to the pair of input disks 21. A thrust force generated by the loading cams 23 makes the shaft 1A and shaft 1B rotate together via the input disks 21 of the first toroidal unit 2A as the shaft 1A rotates. Further, in the first toroidal unit 2A and second toroidal unit 2B, this thrust force presses the input disk 21 toward the output disk 2. Due to this pressing force, the power rollers 20 shown in FIG. 3 gripped by the input disk 21 and output disk 22 transmit a torque from one disk to the other disk.

The inside of a casing 14 of the infinite speed ratio transmission device comprises a space 14X which houses the CVT 2 and the input gear 3A of the fixed speed ratio transmission 3, and an effectively cylindrical space 14Y which houses the sprocket 4A, CVT output shaft 4, planetary gear set 5, final output shaft 6 and output gear 3B of the fixed speed ratio transmission 3. These spaces 14X, 14Y are interconnected. One end of the space 14X reaches an edge 14A of the casing 14 in FIG. 2 on the right-hand side of the figure, and the other end reaches an edge 14B of the casing 14 on the left-hand side of the figure. In the fully assembled infinite speed ratio transmission device, the edge 14A is closed by a partition 15A, and the edge 14B is closed by a side cover 16. The partition 15A forms part of a front casing 15 which joins the casing 14 to the engine, not shown. The edge of the space 14Y on the left-hand side of the figure is closed by a side cover 60.

If the casing 14 is viewed from the right-hand side of FIG. 2 with the partition 15A removed, it is seen that the edge 14A of the casing 14 has an opening 140 for installing the input shaft 1 and CVT 2 in the space 14X when the infinite speed ratio transmission device is assembled, an opening 141 for installing the final output shaft 6, planetary gear unit 5, power circulation mode clutch 9, direct connection mode clutch 10, CVT output shaft 4 and sprocket 4A in the space 14Y, and an opening 142 for installing the drive wheel shafts 11A, 11B in another space. The space which houses the drive wheel shafts 11A, 11B is not shown in FIG. 2.

Referring again to FIG. 2, an intermediate wall 25 which extends into the space 14X toward the center between the two output disks 22 is provided on the inner circumference of the center part of the casing 14. The intermediate wall 25 comprises an annular pair of partitions, i.e., a front partition 25A and a rear partition 25B, which are tightened by plural bolts 25C, and the output sprocket 24 is housed between these partitions. Bearings 26 which support the shaft 1B are fitted on the inner circumferences of the partitions 25A, 25B, respectively.

Figure 4:
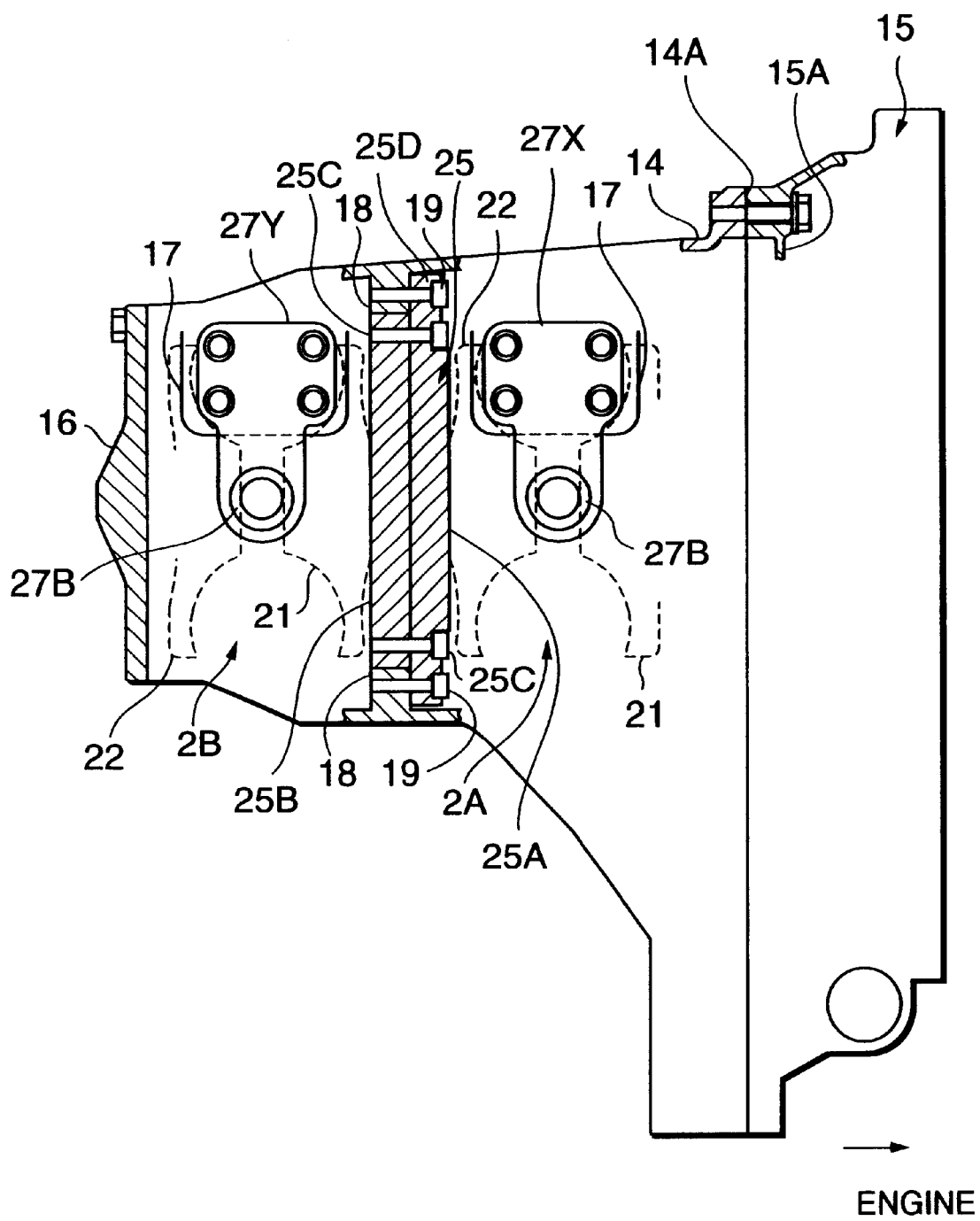
FIG. 4 is a schematic plan view of essential parts of the infinite speed ratio transmission device showing the disposition of an intermediate wall and an upper link supporting member, according to this invention.

Referring to FIG. 4, the intermediate wall 25 is fixed to the casing 14 by bolts 19. For this purpose, extensions 25D are formed in a radial direction in part of the outer circumference of the front partition 25A, and extensions 25D are fixed to a bracket 18 which projects toward the center on the inner circumference of the casing 14 by the bolts 19.

In FIG. 4, for the sake of the convenience, both the bolt 19 and bolt 25C are drawn, but in practice, the bolt 19 and a bolt 25D are disposed at different angles relative to the shaft 1B.

Referring again to FIG. 2, the output sprocket 24 comprises a cylindrical part 24A which extends toward the output disks 22 on each side.

The output sprocket 24 including the cylindrical part 24A is fitted on the outer circumference of the shaft 1B so as to be free to rotate. The outer circumference of each end of the cylindrical part 24A is spline jointed to the inner circumference of each output disk 22.

The outer circumference of the middle of the cylindrical part 24A is supported by partitions 25A and 25B via bearings 26A.

The output disk 22 comes in contact with the shaft 1B via a needle bearing 51. As the output disk 22 is supported by the intermediate wall 25 via the bearing 26 and the cylindrical part 24A of the output sprocket 24, the shaft 1B is also supported in the radial direction via the intermediate wall 25. The edge of the shaft 1B on the left-hand side of the figure is supported by the side cover 16 via a bearing 50.

Figure 3:
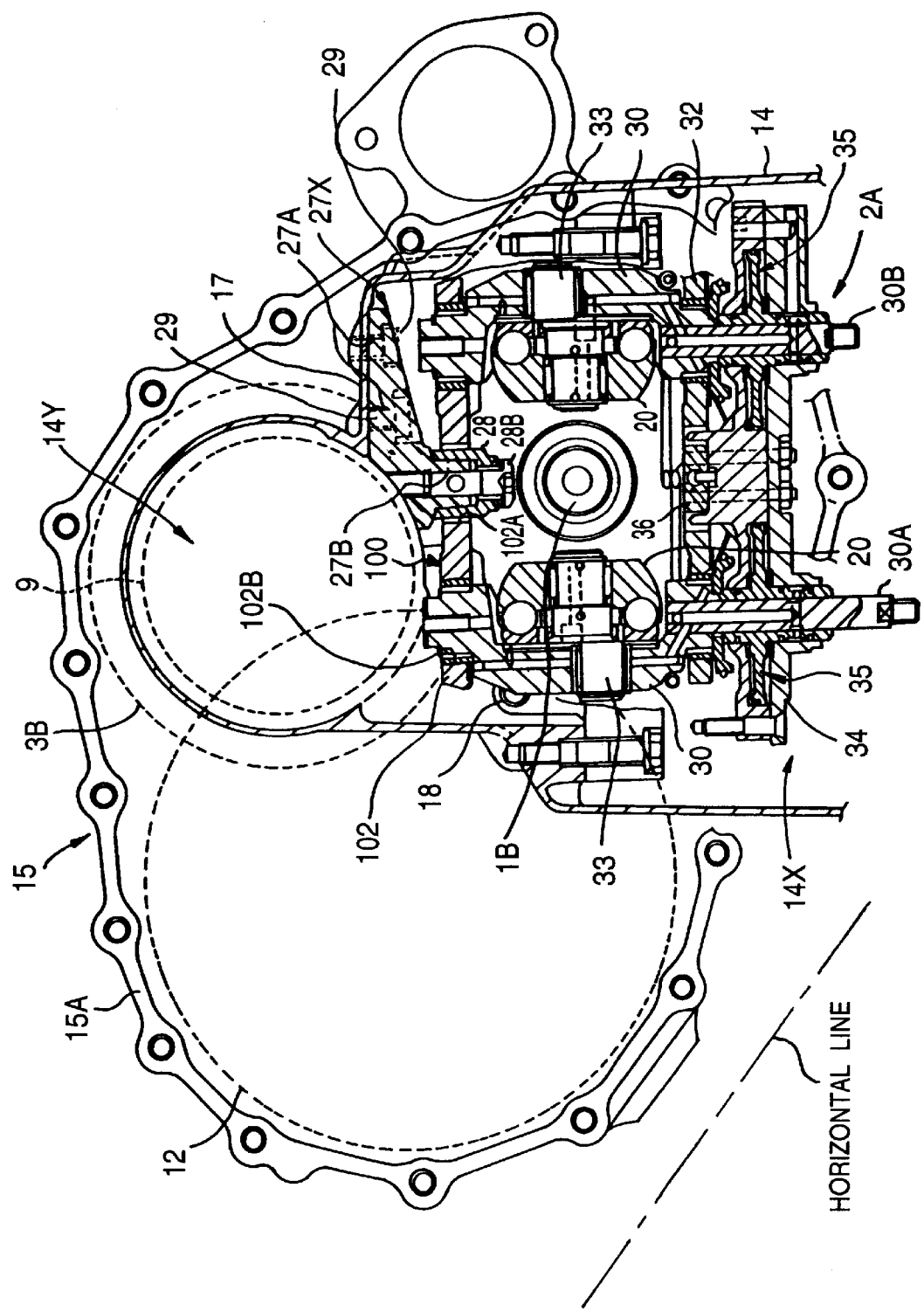
FIG. 3 is a horizontal sectional view of a toroidal continuously variable transmission according to this invention.
Figure 8:
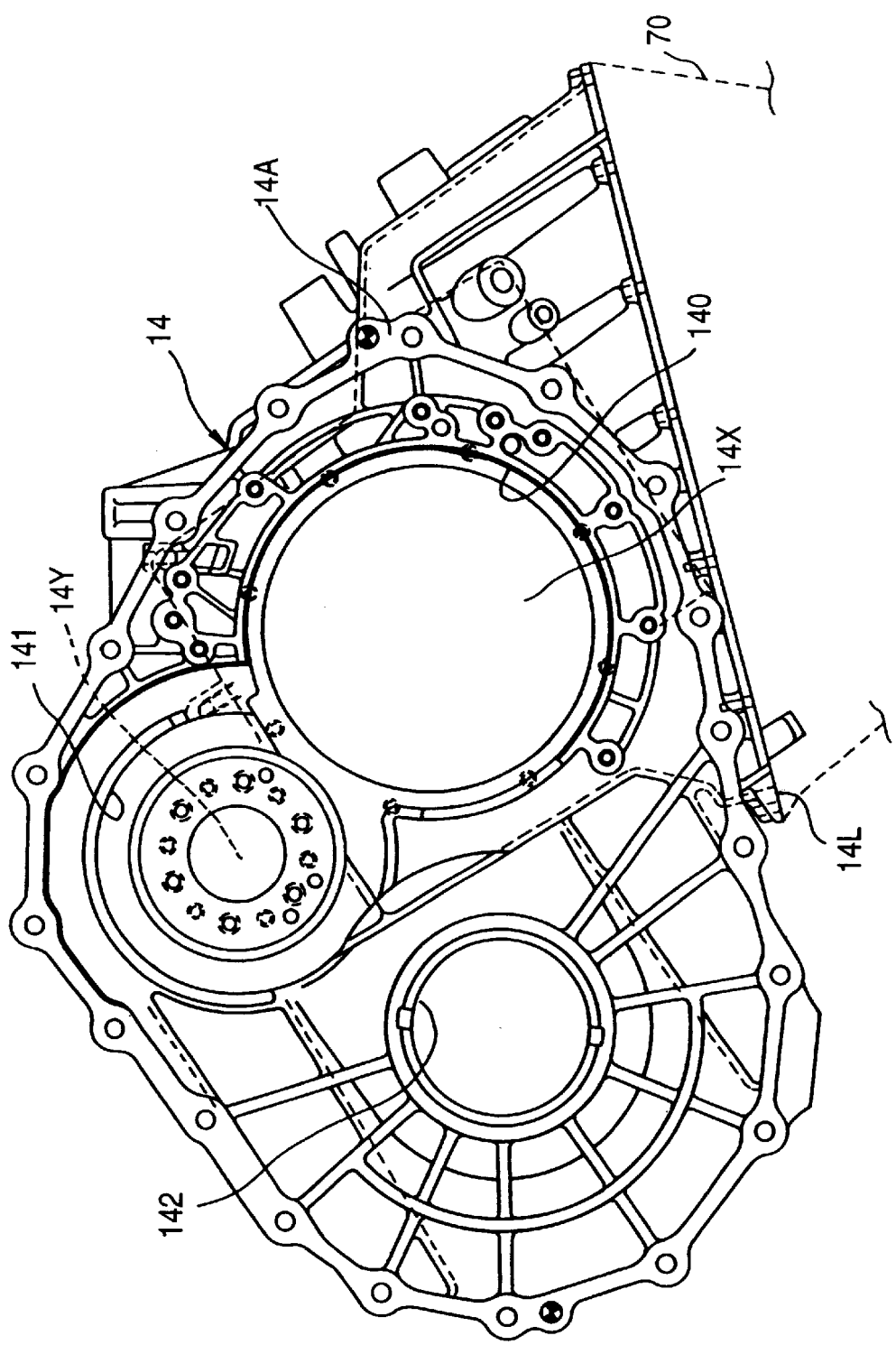
FIG. 8 is a side view of a casing according to this invention.

Next, referring to FIG. 3, in each of the toroidal units 2A, 2B, a pair of power rollers 20 are disposed between the input disk 21 and output disk 22. The power rollers 20 are respectively supported by trunnions 30 via a pivot shaft 33. The lower end of the space 14X which houses the power roller 20 reaches an opening 14L formed in the casing 14, as shown in FIG. 8. The opening 14L is closed by an oil pan 70 in the last stage of assembly of the infinite speed ratio transmission device.

A rod 30A is fixed to the trunnion 30, and a rod 30B is fixed to another trunnion 30. The rods 30A, 30B displace in the axial direction according to an oil pressure supplied by an oil cylinder 35. The upper ends of the four trunnions 30 of the first toroidal unit 2A and second toroidal unit 2B are joined to an upper link 100 via spherical joints. Similarly, the lower ends of the four trunnions 30 are joined to a lower link 32 via spherical joints.

Figure 5:
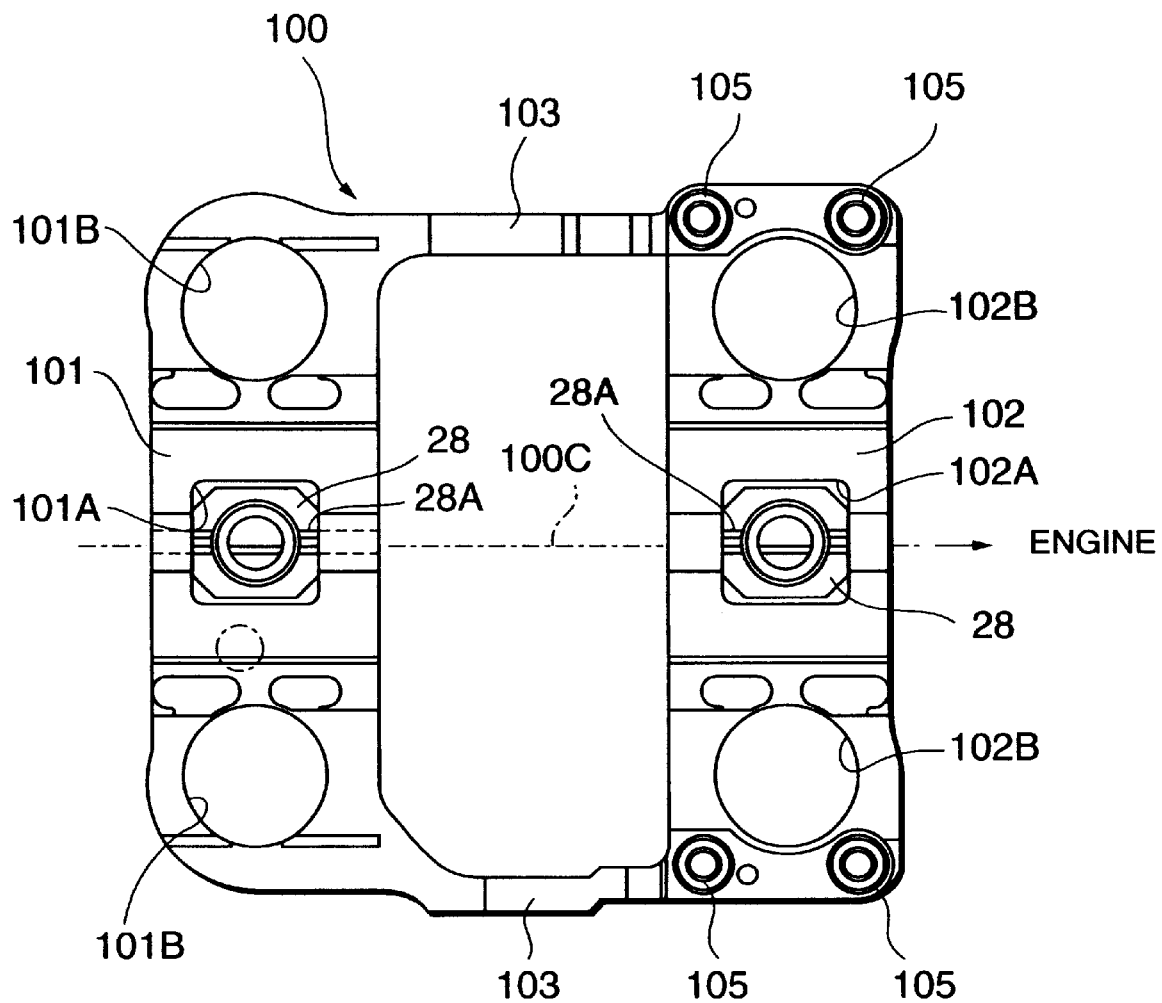
FIG. 5 is a plan view of the upper link according to this invention.

Referring to FIG. 5, the upper link 100 comprises a first part 102 corresponding to the first toroidal unit 2A, and a second part 101 corresponding to the second toroidal unit 2B. A pair of arm-shaped connecting parts 103 joined to the first part 102 are formed in the second part 101.

Figure 6:
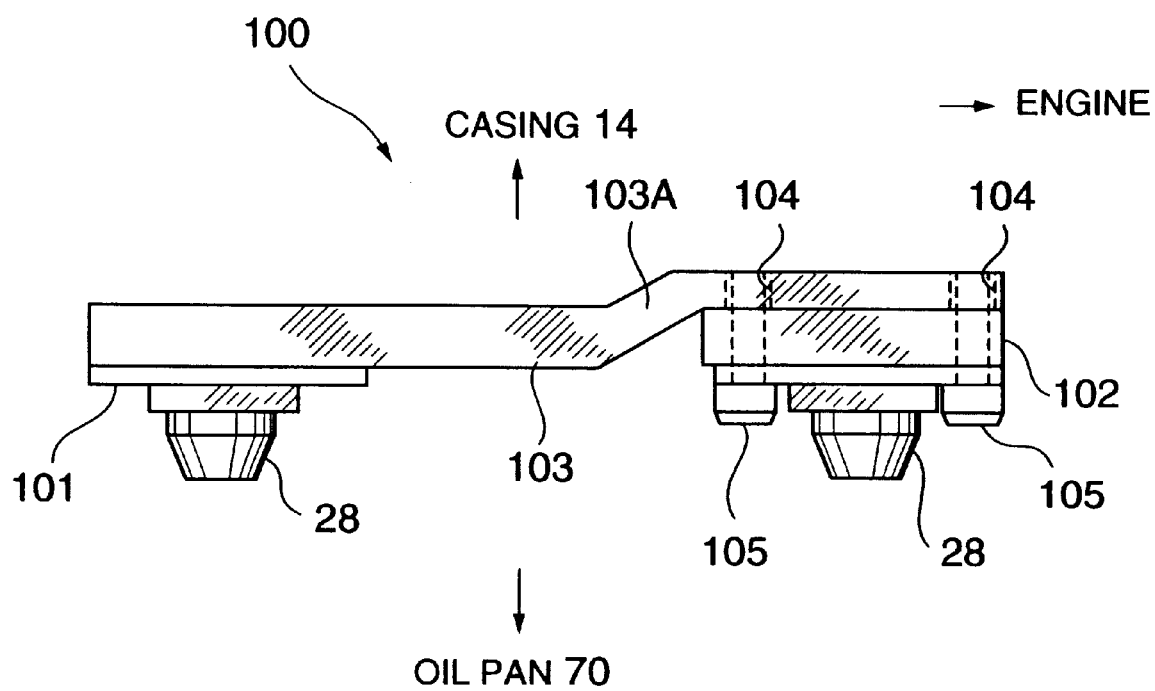
FIG. 6 is a side view of the upper link.

Referring to FIG. 6, two screw holes 104 are formed in each of the connecting parts 103. The first part 102 is fixed to the connecting parts 103 by bolts 105 which respectively screw into the screw holes 104. Each of the connecting parts 103 comprises a bent part 103A which is bent upward so that the first part 102 and second part 101 are at the same height from the shaft 1B.

Referring again to FIG. 5, through holes 101A, 102A of approximately rectangular cross-section are formed in the center parts of the second part 101 and first part 102. An upper link post 28 is supported in these through holes 101A, 102A via a pair of pins 28A. The upper link 100 is free to pivot around a pivot axis 100C represented by a dotted line in the figure, by disposing the pins 28A on the axis 100C. Two holes 101B which engage with the upper ends of the two trunnions 30 of the second toroidal unit 2B via the spherical joints are formed in the second part 101, and two holes 102B which engage with the upper ends of the two trunnions 30 of the first toroidal unit 2B via the spherical joints are formed in the first part 102.

Figure 7:
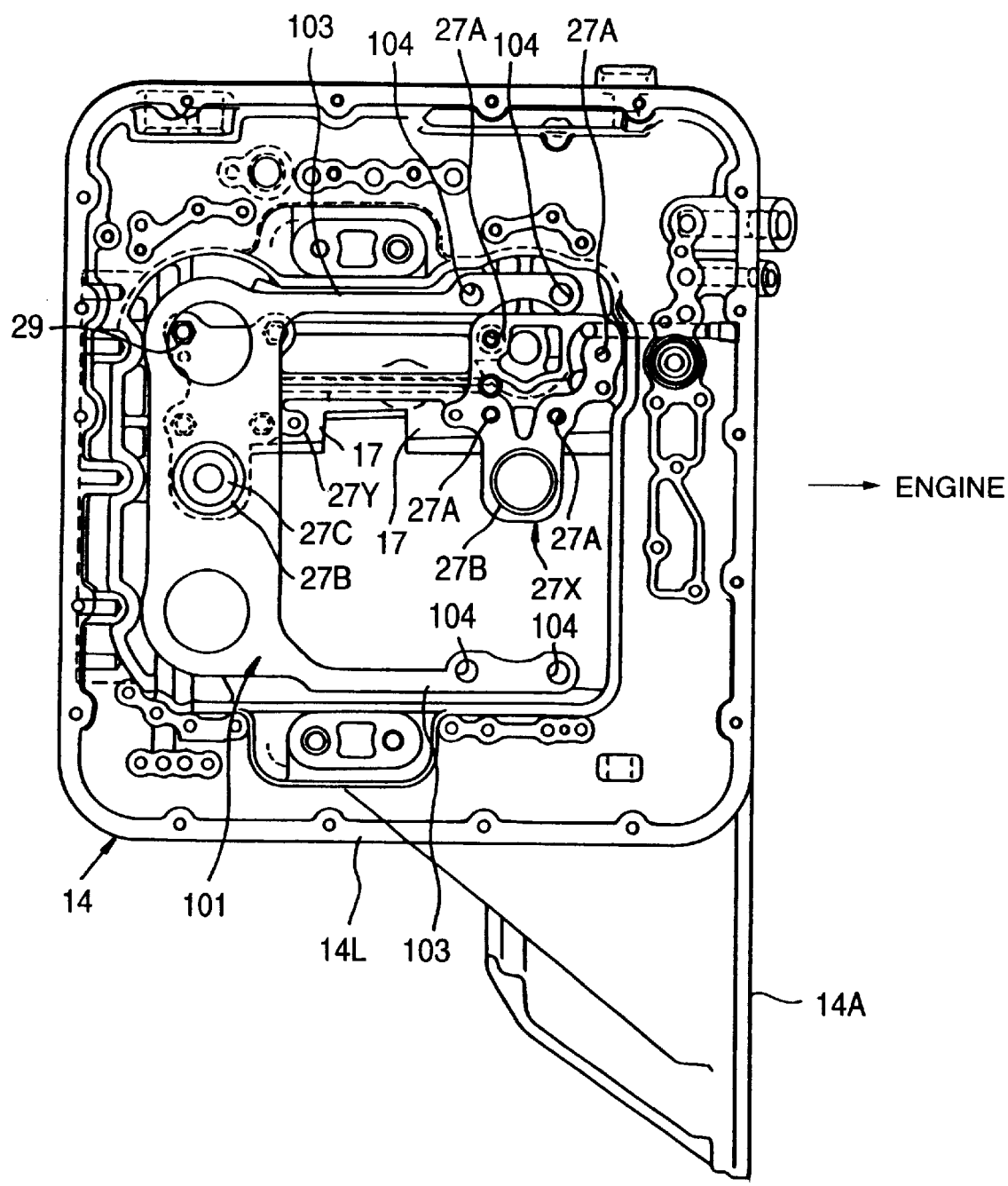
FIG. 7 is a plan view of the toroidal continuously variable transmission viewed from underneath.

Referring to FIG. 3, a first upper link supporting member 27X is fixed to a roof part 17 of the casing 14 in the first toroidal unit 2A. The first upper link supporting member 27X comprises a post base 27B which projects downwards. The first upper link supporting member 27X has plural through holes 27A, and is fixed to the roof part 17 by bolts 29 which penetrate these through holes 27A. A second upper link supporting member 27Y having the same construction is similarly provided in the second toroidal unit 2B, as shown in FIGS. 4 and 7.

The shape and dimensions of the first upper link supporting member 27X and those of the upper link 100 are determined so that the connecting parts 103 of the upper link 100 do not interfere with the first upper link supporting member 27X. Specifically, the connecting parts 103 are disposed outside the first upper link supporting member 27X of the first toroidal unit 2A as shown in FIG. 7. Due to this construction, when the CVT 2 is assembled, the supporting member 27Y and the second part 101 are first attached to the casing 14 alone, and the upper link supporting member 27X can then be attached to the casing 14.

Bolt holes 27C are formed in a vertical direction in the center of the post base 27B. The above-mentioned upper link post 28 is a cap-shaped component which is attached to the outer circumference of the post base 27B from underneath, and is fixed to the post base 27B by tightening the bolt 28B which penetrates the upper link post 28, in the bolt hole 27C. The direction of projection of the post base 27B is effectively parallel to the rods 30A and 30B of the trunnion 30. The construction of the post base 27B and upper link post 28 are identical to that of Tokkai Hei 9-317837 of the aforesaid prior art.

Referring again to FIG. 5, pins 28A which join the upper link post 28 to the upper link 100 project from pinholes formed in the part 101 (102) along the axis 100C towards the center of the through hole 101A (102A), and penetrate pinholes formed in the wall surface of the upper link post 28 on both sides of the bolt 28B. The upper link posts 28 are fitted to the parts 101 and 102 in this way preceding the assembly of the infinite speed ratio transmission device.

Referring again to FIG. 3, the lower link 32 is supported by a lower link pivot 36 fixed to a body 34 of oil cylinders 35 via a pin, and pivots about a pivot axis parallel to the pivot axis 100C. The body 34 is fixed to the casing 14 via a bracket, not shown. The construction of the lower link 32 is identical to that of Tokkai Hei 9-317837 of the aforesaid prior art.

Due to the above construction, the two trunnions 30 of the first toroidal unit 2A displace in opposite directions in the axial direction according to the oil pressure supplied to the oil cylinders 35 while the distance between the rods 30A, 30B is maintained effectively constant. Similarly, the two trunnions 30 of the second toroidal unit 2B displace in opposite directions in the axial direction while the distance between the rods 30A, 30B is maintained effectively constant.

Figure 9:
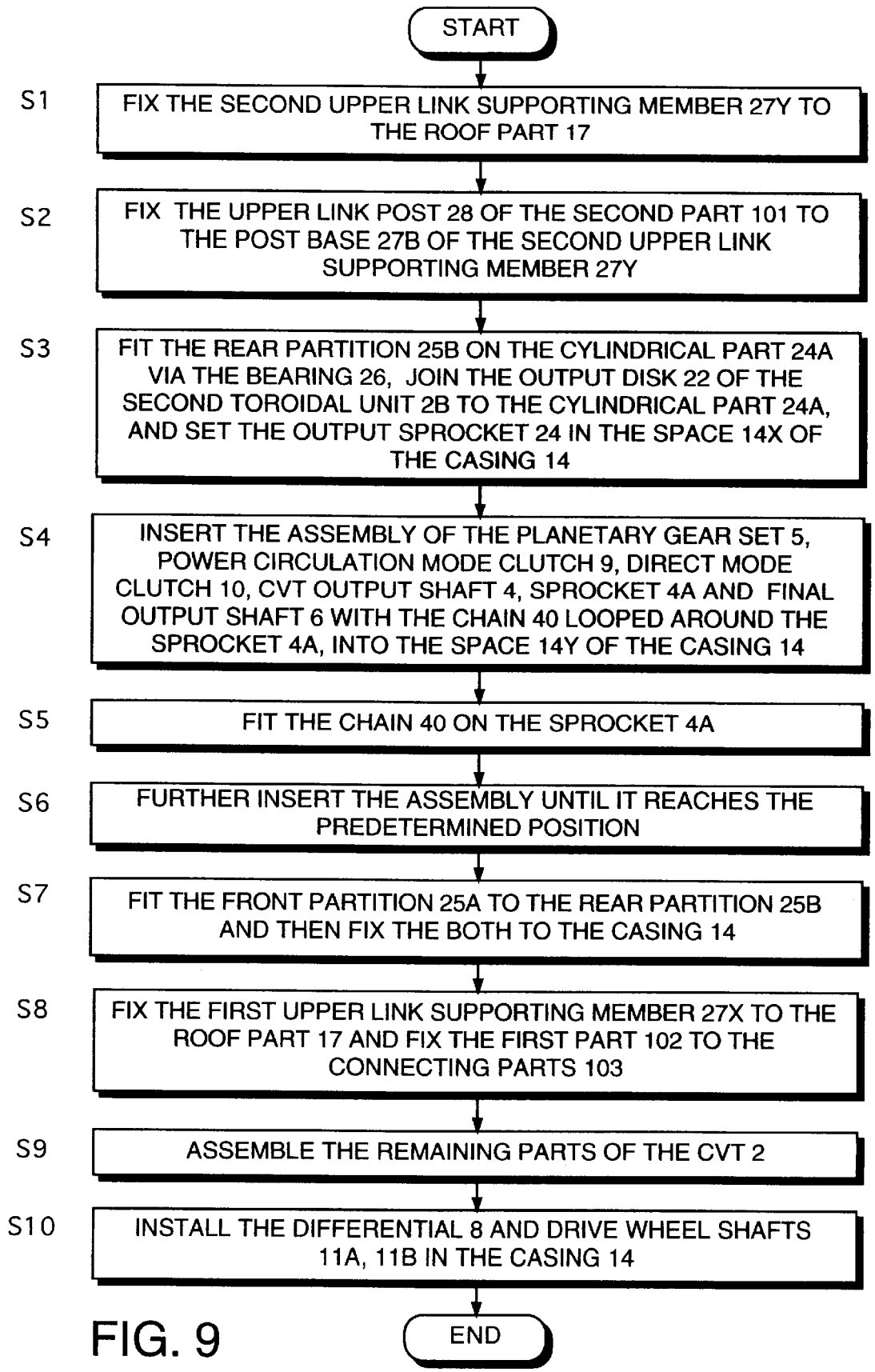
FIG. 9 is a flow chart describing the process of assembling the infinite speed ratio transmission device according to this invention.

Next, a method of assembling this infinite speed ratio transmission device including the installation of the upper link 100 will be described referring to the flowchart of FIG. 9.

First, in a step S1, the second upper link supporting member 27Y of the second toroidal unit 2B is fixed to the roof part 17. This operation is performed from the opening 14L.

In a step S2, the upper link post 28 attached to the second part 101 of the upper link 100 is fixed to the post base 27B of the second upper link supporting member 27Y by the bolt 28B.

In a step S3, the rear partition 25B of the intermediate wall 25 is fitted to the outer circumference of the cylindrical part 24A of the output sprocket 24 via the bearing 26, and the output disk 22 of the second toroidal unit 2B is spline jointed to the cylindrical part 24A. The assembly thus constructed is inserted into the space 14X from the opening at the edge 14B, and set in a predetermined position.

In a step S4, the assembly comprising the planetary gear set 5, power circulation mode clutch 9, direct mode clutch 10, CVT output shaft 4 and sprocket 4A fitted on the final output shaft 6, is inserted into a predetermined position of the space 14Y from the opening 141 at the edge 14A of the casing 14. Before inserting, the chain 40 is looped around the sprocket 4A. During the insertion into the space 14Y, the chain 40 hangs down in the space 14X from the assembly.

In a step S5, the chain 40 is fitted on the sprocket 4A which has already been set in the predetermined position.

In a step S6, the assembly is inserted further back in the space 14Y until the end of the final output shaft 6 reaches the edge 14C shown in FIG. 2 of the space 14Y. After the assembly reaches a predetermined position, the side cover 60 is fixed to the casing 14 so that the edge 14C is closed.

In a step S7, the front partition 25A is inserted into the space 14X, and tightly fitted to the rear partition 25B by the bolts 25C. The front partition 25A and rear partition 25B formed in one piece in this way are then fixed to the bracket 18 of the casing 14 by the bolts 19.

In a step S8, the first upper link supporting member 27X of the first toroidal unit 2A is tightened to the roof part 17 by passing the bolts 29 through the through holes 27B shown in FIG. 7. The first part 102 of the upper link 100 is then fixed to the connecting parts 103 by the bolts 105. These operations are performed by inserting tools into the space 14X from the opening 14L of the casing 14.

In a step S9, the remaining parts of the CVT 2 are assembled.

That is, the output disk 22 of the first toroidal unit 2A is first inserted into the space 14X, and spline-jointed to the cylindrical part 24A of the output sprocket 24. The shaft 1B equipped with the input disk 21 of the first toroidal unit 2A and the loading cams 23 is also inserted in the space 14X from the opening 140 of the edge 14A. The shaft 1B is passed through the cylindrical part 24A, the pair of output disks 22 and the intermediate wall 25 which were already set, and set in a predetermined position. The input disk 21 of the second toroidal unit 2B is also fitted to the end of the shaft 1B from the edge 14B on the opposite side, and the side cover 16 is fixed to casing 14. The four trunnions 30 in which the power rollers 20 were set, is inserted in the space 14X from the opening 14L, the upper ends of the trunnion 30 are engaged in the through holes 102B, 101B formed in the first part 102 and second part 101 of the upper link 100, and the power rollers 20 are set between the input disk 21 and output disk 22 of each of the toroidal unit 2A, 2B. The lower link 32 and the oil cylinders 35 are then fitted to the lower part of the trunnion 30 in this order. Finally, in a step S10, the differential 8, and drive wheel shafts 11A and 11B, are installed, and the partition 15A of the front casing 15 is attached to the edge 14B of the casing 14. The oil pan 70 is also attached to the casing.

As mentioned above, in this infinite speed ratio transmission device, as the upper link 100 was partitioned into the first part 102 and the second part 101, the chain 40 can be fitted to the sprocket 24 before attaching the upper link supporting member 27X and the part 102 to the casing 14. Hence, the fitting of the chain to the sprocket 24 may be performed without interfering with the first upper link supporting member 27X or the upper link 100. Moreover, the pair of arm-shaped connecting parts 103 was formed in the second part 101, so the first part 102 and second part 101 can easily be formed in one piece by fixing the first part 102 to the connecting part 103 after fitting the chain 40 on the sprocket 24, and decline of strength due to splitting the upper link 100 can be avoided.

The contents of Tokugan Hei 11-35877, with a filing date of Feb. 15, 1999 in Japan, are hereby incorporated by reference.

Although the invention has been described above by reference to certain embodiments of the invention, the invention is not limited to the embodiments described above. Modifications and variations of the embodiments described above will occur to those skilled in the art, in light of the above teachings.

For example, in the above embodiment, in the steps S3–S6, the chain 40 is fitted to the output sprocket 24 when the intermediate wall 25 has been partially assembled in the interior of the casing 14, however the sprocket 4A and sprocket 24 can first be connected by the chain 40 outside the casing 14, and the front partition 25A and rear partition 25B fixed by the bolts 25C with the sprocket 24 housed inside. The assembly thus assembled is then inserted in the casing 14, and the intermediate wall 25 is fixed to the casing 14 by the bolts 19. According to this technique, the work that has to be performed inside the casing 14 can be further reduced, and the efficiency of assembly of the infinite speed ratio transmission device can be further increased.

Further, if the output disks 22 are previously spline-jointed to the output sprocket 24 of the above-mentioned assembly, the work performed inside the casing 14 can be still further reduced.

The embodiments of this invention in which an exclusive property or privilege is claimed are defined as follows:

What is claimed is:

1. An infinite speed ratio transmission device for a vehicle, comprising:
   an input shaft;
   a first toroidal unit comprising a first input disk which rotates together with the input shaft, a first output disk, and two power rollers gripped between the first input disk and the first output disk;
   a second toroidal unit comprising a second input disk which rotates together with the input shaft, a second output disk, and two power rollers gripped between the second input disk and the second output disk, the first output disk and the second output disk being disposed coaxially and adjacent to each other;

an output sprocket which is disposed between and rotates together with the first output disk and the second output disk;

four trunnions which support the four power rollers of the first toroidal unit and the second toroidal unit;

an upper link holding the upper end of the four trunnions, the upper link comprising a first part holding the two trunnions of the first toroidal unit, and a second part holding the two trunnions of the second toroidal unit, the first part and the second part being formed separately and fixed to each other;

a fixed speed ratio transmission which transmits a rotation of the input shaft at a fixed speed ratio to an output gear;

a planetary gear set comprising a sun gear joined to a sprocket, a planet carrier which rotates together with the output gear, and a ring gear which rotates according to a relative rotation of the sun gear and the planet carrier;

a chain connecting the output sprocket and the sprocket;

a casing housing the first toroidal unit, the second toroidal unit and the planetary gear set;

a first upper link supporting member fixed to the casing which supports the first part in the casing;

a second upper link supporting member fixed to the casing which supports the second part in the casing; and an intermediate wall fixed to the casing which supports the output sprocket free to rotate.

2. An infinite speed ratio transmission device as defined in claim 1, wherein the casing has an opening formed in a position facing the upper link.

3. An infinite speed ratio transmission device as defined in claim 2, wherein the casing has other openings which form approximate right angles with the input shaft.

4. An infinite speed ratio transmission device as defined in claim 1, wherein the second part comprises a pair of arm-shaped connecting parts fixed to the first part.

5. An infinite speed ratio transmission device as defined in claim 4, wherein the casing has an opening formed in a position facing the upper link, and the connecting part is disposed on the outside of the first upper link supporting member viewed from the opening so that the first upper link supporting member can be fixed to the casing without interfering with the connecting part in a state where the second part has been supported in the casing by the second upper link supporting member.

6. An infinite speed ratio transmission device as defined in claim 4, wherein a bent part is formed midway in each of the connecting parts so that the first part and the second part have an identical height with respect to the input shaft.

7. An infinite speed ratio transmission device as defined in claim 1, wherein the intermediate wall comprises a front partition interposed between the output disk of the first toroidal unit and the output sprocket, a rear partition interposed between the output disk of the second toroidal unit and the output sprocket, and a member for fixing the front partition to the rear partition.

8. A method of assembling an infinite speed ratio transmission device for a vehicle, the transmission device comprising an input shaft, a first toroidal unit comprising a first input disk which rotates together with the input shaft, a first output disk, and two power rollers gripped between the first input disk and the first output disk, a second toroidal unit comprising a second input disk which rotates together with the input shaft, a second output disk, and two power rollers gripped between the second input disk and the second output disk, the first output disk and the second output disk being disposed coaxially and adjacent to each other, an output sprocket which is disposed between and rotates together with the first output disk and the second output disk, four trunnions which support the four power rollers of the first toroidal unit and the second toroidal unit, an upper link holding the upper end of the four trunnions, the upper link comprising a first part holding the two trunnions of the first toroidal unit, and a second part holding the two trunnions of the second toroidal unit, the first part and the second part being formed separately and fixed to each other, a fixed speed ratio transmission which transmits a rotation of the input shaft at a fixed speed ratio to an output gear, a planetary gear set comprising a sun gear joined to a sprocket, a planet carrier which rotates together with the output gear, and a ring gear which rotates according to a relative rotation of the sun gear and the planet carrier, a chain connecting the output sprocket and the sprocket, a casing housing the first toroidal unit, the second toroidal unit and the planetary gear set, a first upper link supporting member fixed to the casing which supports the first part in the casing, a second upper link supporting member fixed to the casing which supports the second part in the casing, and an intermediate wall fixed to the casing which supports the output sprocket free to rotate, the assembly method comprising:

fixing the second upper link supporting member to the casing;

fitting the second part to the second upper link supporting member;

setting the output sprocket at a predetermined position in the casing;

inserting the sprocket around which the chain has been looped and the planetary gear unit in the casing;

looping the chain around the output sprocket;

setting the sprocket and the planetary gear unit at a predetermined position in the casing;

fixing the first upper link supporting member to the casing;

fitting the first part to the first upper link supporting member; and joining the first part to the second part.

9. A method of assembling an infinite speed ratio transmission device for a vehicle, the transmission device comprising an input shaft, a first toroidal unit comprising a first input disk which rotates together with the input shaft, a first output disk, and two power rollers gripped between the first input disk and the first output disk, a second toroidal unit comprising a second input disk which rotates together with the input shaft, a second output disk, and two power rollers gripped between the second input disk and the second output disk, the first output disk and the second output disk being disposed coaxially and adjacent to each other, an output sprocket which is disposed between and rotates together with the first output disk and the second output disk, four trunnions which support the four power rollers of the first toroidal unit and the second toroidal unit, an upper link holding the upper end of the four trunnions, the upper link comprising a first part holding the two trunnions of the first toroidal unit, and a second part holding the two trunnions of the second toroidal unit, the first part and the second part being formed separately and fixed to each other, a fixed speed ratio transmission which transmits a rotation of the input shaft at a fixed speed ratio to an output gear, a planetary gear set comprising a sun gear joined to a sprocket, a planet carrier which rotates together with the output gear, and a ring gear which rotates according to a relative rotation of the sun gear and the planet carrier, a chain connecting the output sprocket and the sprocket, a casing housing the first toroidal unit, the second toroidal unit and the planetary gear set, a first upper link supporting member fixed to the casing which supports the first part in the casing, a second upper link supporting member fixed to the casing which supports the second part in the casing, and an intermediate wall fixed to the casing which supports the output sprocket free to rotate, the intermediate wall comprising a front partition disposed between the first output disk and the output sprocket, a rear partition disposed between the second output disk and the output sprocket, and a fixing member which fixes the front partition to the rear partition, the assembly method comprising:

fixing the second upper link supporting member to the casing;

fitting the second part to the second upper link supporting member;

setting the output sprocket at a predetermined position in the casing together with the rear partition;

inserting the sprocket around which the chain has been looped and the planetary gear unit in the casing;

looping the chain around the output sprocket;

setting the sprocket and the planetary gear unit at a predetermined position in the casing;

fixing the front partition to the rear partition by the fixing member;

fixing the first upper link supporting member to the casing;

fitting the first part to the first upper link supporting member; and joining the first part to the second part.

10. A method of assembling an infinite speed ratio transmission for a vehicle, the transmission device comprising an input shaft, a first toroidal unit comprising a first input disk which rotates together with the input shaft, a first output disk, and two power rollers gripped between the first input disk and the first output disk, a second toroidal unit comprising a second input disk which rotates together with the input shaft, a second output disk, and two power rollers gripped between the second input disk and the second output disk, the first output disk and the second output disk being disposed coaxially and adjacent to each other, an output sprocket which is disposed between and rotates together with the first output disk and the second output disk, four trunnions which support the four power rollers of the first toroidal unit and the second toroidal unit, an upper link holding the upper end of the four trunnions, the upper link comprising a first part holding the two trunnions of the first toroidal unit, and a second part holding the two trunnions of the second toroidal unit, the first part and the second part being formed separately and fixed to each other, a fixed speed ratio transmission which transmits a rotation of the input shaft at a fixed speed ratio to an output gear, a planetary gear set comprising a sun gear joined to a sprocket, a planet carrier which rotates together with the output gear, and a ring gear which rotates according to a relative rotation of the sun gear and the planet carrier, a chain connecting the output sprocket and the sprocket, a casing housing the first toroidal unit, the second toroidal unit and the planetary gear set, a first upper link supporting member fixed to the casing which supports the first part in the casing, a second upper link supporting member fixed to the casing which supports the second part in the casing, and an intermediate wall fixed to the casing which supports the output sprocket free to rotate, the assembly method comprising:

fixing the second upper link supporting member to the casing;

fitting the second part to the second upper link supporting member;

looping the chain around the output sprocket and the sprocket;

fitting the intermediate wall on the output sprocket;

setting the output sprocket on which the intermediate wall is fitted and the planetary gear set in which the sprocket is combined with the output sprocket via the chain, at a predetermined position in the casing;

fixing the first upper link supporting member to the casing fitting the first part to the first upper link supporting member; and joining the first part to the second part.

* * * * *